H. L. DOANE & S. CASWELL.
BOG CUTTER.
APPLICATION FILED DEC. 4, 1916.

1,247,382.

Patented Nov. 20, 1917.

Witness
Walter H. Troemel.

Inventors
Harriet L. Doane &
Solomon Caswell
Bradford & Doolittle
Attorneys

By

UNITED STATES PATENT OFFICE.

HARRIET L. DOANE AND SOLOMON CASWELL, OF FULTON, NEW YORK.

BOG-CUTTER.

1,247,382.   Specification of Letters Patent.   Patented Nov. 20, 1917.

Application filed December 4, 1916.   Serial No. 135,022.

*To all whom it may concern:*

Be it known that we, HARRIET L. DOANE and SOLOMON CASWELL, citizens of the United States, residing at Fulton, Oswego county, and State of New York, have invented and discovered certain new and useful Improvements in Bog-Cutters, of which the following is a specification.

Our invention relates to bog cutters and its object is to provide an implement adapted to be drawn along the ground by animal draft or propelled by power and adapted for effectively shearing tufts of bog grass.

With these objects and others in view, my invention is embodied in preferable form in the construction hereinafter described and illustrated in the accompanying drawings.

Figure 1:
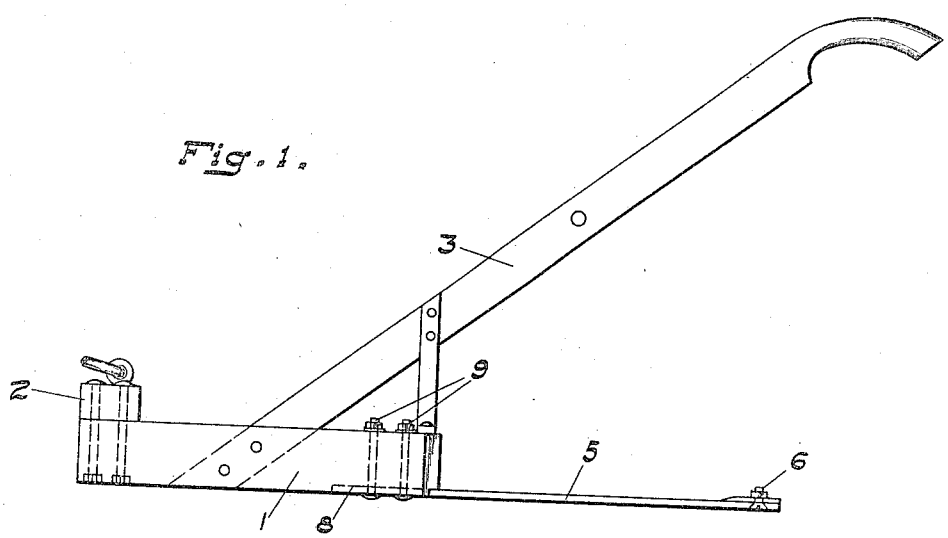
Figure 2:
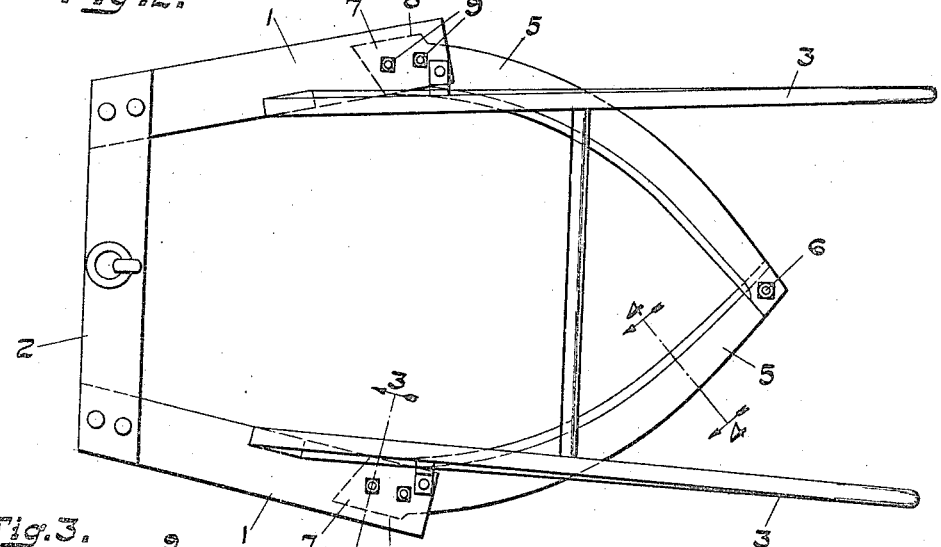
Figure 3:
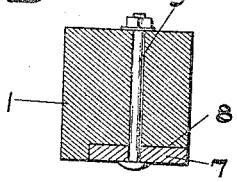
Figure 4:

In these drawings, Figure 1 is a side elevation of my improved bog cutter; Fig. 2, a plan view thereof; Fig. 3, a detail section on the line 3—3 of Fig. 2, and Fig. 4, a detail section on the line 4—4 of Fig. 2.

Referring to the drawings, the implement comprises a blade supporting and traveling body in the form of a sledge in which 1 are two side runners spaced apart transversely and adapted to bear on the ground. These runners are connected at their forward ends by a cross beam 2 constituting a draft bar to which the draft gear attached to the horse is adapted to be connected.

Rising from the runners are handles 3, adapted to be grasped by the driver for guiding the sledge and pressing the same downward to contact with the ground.

Secured to the lower surface of the runners and extending rearwardly therefrom in a plane substantially parallel with said lower surfaces is a cutting member comprising blades or arms 5 which project inwardly from the runners and meet at an apex behind the latter and are at such junction either integrally joined or preferably connected by a bolt 6. These blades have their cutting edges on their inner borders, and such edges are curved concavely.

Preferably the runners are slanted outward slightly from the cross beam so that at the points where they join the inner side of the blades the greatest width of the implement is provided, whereby it is rendered possible to encircle a large tuft or clump of bog grass.

The inner end of each blade or arm of the cutting member is provided with an angled shank 7 adapted to fit into an undercut recess 8, formed in the lower surface of the runner and which shank is adapted to be engaged by a pair of bolts 9 passing through the runner.

In the use of the device, the runners and blades are placed over the bog tuft so as to encircle the same and the sledge then drawn along by the horse, whereupon the blades, which lie flat upon the ground, owing to their location on the bottom surfaces of the runners, will be carried against the bog tufts and cut the same level with the surface of the land, leaving the latter in condition to be readily plowed. As the sledge is drawn along, it will be seen that the concave edges of the blades will come in contact first with the outer stalk of the tuft, severing the same with a shearing cut and that the blades will then be converged upon the central part of the tuft and pass against all the stalks, so as to completely level the tuft.

Having thus described our invention, what we claim is:

1. A bog cutter comprising a supporting body and having blades extending to the rear of said body and provided with continuous concave cutting edges, meeting at their rear ends.

2. A bog cutter provided with a supporting body comprising runners adapted to bear on the ground and a cutting member having its cutting edge extending from the lower surfaces of each runner rearwardly in concave curves and joined at their rear ends.

In witness whereof we have hereunto set our hands and seals at Fulton, Oswego Co., New York, this 21st day of November, A. D. nineteen hundred and sixteen.

HARRIET L. DOANE.   [L. S.]
SOLOMON CASWELL.   [L. S.]

Witnesses:
M. DICKERMAN,
N. C. COOK.